United States Patent
Lu et al.

(10) Patent No.: US 10,184,846 B2
(45) Date of Patent: Jan. 22, 2019

(54) SYSTEMS AND METHODS FOR COMPENSATING FOR AIR GAP SENSITIVITY IN TORQUE SENSORS

(71) Applicant: General Electric Company, Schenectady, NY (US)

(72) Inventors: Dan Tho Lu, Minden, NV (US); Lysle R. Turnbeaugh, Minden, NV (US); David Erik Folkner, Minden, NV (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 15/253,522

(22) Filed: Aug. 31, 2016

(65) Prior Publication Data
US 2018/0058958 A1 Mar. 1, 2018

(51) Int. Cl.
| | | |
|---|---|---|
| *G01L 3/00* | (2006.01) | |
| *G01L 3/10* | (2006.01) | |
| *G01D 3/036* | (2006.01) | |
| *G01D 5/20* | (2006.01) | |
| *G01B 7/14* | (2006.01) | |
| *G01L 1/12* | (2006.01) | |

(52) U.S. Cl.
CPC ............ *G01L 3/102* (2013.01); *G01D 3/0365* (2013.01); *G01D 5/2046* (2013.01); *G01B 7/14* (2013.01); *G01L 1/125* (2013.01); *G01L 1/127* (2013.01); *G01L 3/105* (2013.01)

(58) Field of Classification Search
CPC ......... G01L 3/105; G01L 3/102; G01L 1/127; G01L 1/125; G01B 7/14
USPC ......... 73/862.333, 779, 862.191; 324/207.15
See application file for complete search history.

(56) References Cited

U.S. PATENT DOCUMENTS

| | | | |
|---|---|---|---|
| 4,939,937 A | 7/1990 | Klauber et al. | |
| 5,495,774 A | 3/1996 | Klauber et al. | |
| 7,845,243 B2* | 12/2010 | Poirier | G01L 3/109 |
| | | | 73/862.191 |
| 9,070,873 B2 | 6/2015 | Herbst | |
| 9,146,163 B2 | 9/2015 | Sipila et al. | |

(Continued)

FOREIGN PATENT DOCUMENTS

| | | |
|---|---|---|
| WO | 2012/152720 A1 | 11/2012 |
| WO | 2016/034487 A1 | 3/2016 |

OTHER PUBLICATIONS

Extended European Search Report and Opinion issued in connection with corresponding EP Application No. 16199472.8 dated Jul. 5, 2017.

*Primary Examiner* — Jonathan Dunlap
(74) *Attorney, Agent, or Firm* — Mintz Levin Cohn Ferris Glovsky and Popeo, P.C.

(57) ABSTRACT

A system may include a first sensor and a second sensor. The first sensor may include a driving pole that includes a driving coil that receives a driving current and emits a magnetic flux portion through a structure. The first sensor may also include a sensing pole that may include a sensing coil that receives the magnetic flux portion and generate a first signal based at least in part on the received magnetic flux portion. The first signal is based at least in part on a force on the structure. The second sensor may be disposed on the driving pole and may generate a second signal representative of a distance between the driving pole and the structure. The system may also include a circuit that may adjust the first signal based on the second signal.

18 Claims, 8 Drawing Sheets

(56) References Cited

U.S. PATENT DOCUMENTS

| | | | |
|---|---|---|---|
| 2008/0257069 A1* | 10/2008 | Poirier | G01L 3/109 |
| | | | 73/862.191 |
| 2009/0025488 A1 | 1/2009 | Sihler et al. | |
| 2012/0126833 A1* | 5/2012 | Dooley | G01N 3/066 |
| | | | 324/657 |
| 2014/0182388 A1* | 7/2014 | Sipila | G01L 1/125 |
| | | | 73/779 |
| 2014/0366637 A1 | 12/2014 | Brummel et al. | |
| 2015/0028859 A1* | 1/2015 | May | G01D 5/145 |
| | | | 324/207.15 |
| 2015/0323397 A1* | 11/2015 | May | G01L 1/125 |
| | | | 73/779 |

* cited by examiner

SYSTEMS AND METHODS FOR COMPENSATING FOR AIR GAP SENSITIVITY IN TORQUE SENSORS

BACKGROUND

The subject matter disclosed herein relates generally to sensors, and more particularly to magnetostrictive torque sensors.

Sensors are used in a variety of industries to sense vibration, torque, speed, force, position, temperature, and other parameters. In certain applications, the performance of the sensor may decrease due to electrical and/or magnetic interference, temperature fluctuations, and stress, among others. In one particular example, magnetostrictive torque sensors may be sensitive to an amount of air or space between the sensor and the piece of equipment that the torque is being measured. Accordingly, it may be beneficial to provide systems and methods to compensate for the sensitivity influences caused by distance between poles that include the sensors and the item being measured that may affect the performance of a torque sensor.

BRIEF DESCRIPTION

Certain embodiments commensurate in scope with the present disclosure are summarized below. These embodiments are not intended to limit the scope of the claims, but rather these embodiments are intended only to provide a brief summary of certain embodiments. Indeed, embodiments of the present disclosure may encompass a variety of forms that may be similar to or different from the embodiments set forth below.

In a first embodiment, a system may include a first sensor and a second sensor. The first sensor may include a driving pole that includes a driving coil that receives a driving current and emits a magnetic flux portion through a structure. The first sensor may also include a sensing pole that may include a sensing coil that receives the magnetic flux portion and generate a first signal based at least in part on the received magnetic flux portion. The first signal is based at least in part on a force on the structure. The second sensor may be disposed on the driving pole and may generate a second signal representative of a distance between the driving pole and the structure. The system may also include a circuit that may adjust the first signal based on the second signal.

In another embodiment, a method may include receiving, via a processor, a first signal indicative of a distance between a magnetically permeable pole that may couple to a first sensor and an object. The method may then include receiving, via the processor, a second signal indicative of an amount of force present on the object and adjusting the second signal based on the first signal.

In yet another embodiment, a sensor may include a first coil that may emit a magnetic flux portion through a structure and at least one sensing coil that may receive the magnetic flux portion and to generate a first signal based at least in part on the received first magnetic flux portion. The first signal is based at least in part on a force on the structure. The sensor may also include a proximity sensor that may generate a second signal representative of a distance between a magnetically permeable pole configured to couple to the proximity sensor and the structure. The sensor may also include a circuit that may compensate for effects due to the distance present on the first signal based on the second signal.

BRIEF DESCRIPTION OF THE DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In certain embodiments, non-contact sensors may be used to measure the torque of a piece of machinery or equipment, such as a shaft. Magnetostrictive torque sensors for such applications employ a sensing method in which a magnetic field is generated in the sensor by passing electric current through an excitation coil. In magnetostrictive torque sensors, this magnetic field permeates from a driving coil over an air-gap to the shaft and returns back to one or more sensing coils (e.g., a pick-up coil) of the sensor. The output of the sensing coil is an electrical signal that depends at least in part on the total magnetic reluctance of this loop through the shaft. Part of the total magnetic reluctance is established by the air gap between the poles (e.g., end of the pole, end of the core) and the shaft and part of the total magnetic reluctance is established by the shaft itself with the magnetic reluctance of the shaft changing as a function of torque on the shaft.

Non-contact magnetostrictive torque sensors may be used to measure various types of stresses (e.g., the torque) being applied to a shaft of a rotating machine. As mentioned above, part of the total magnetic reluctance received via sensing coils is caused by the air gap between the driving poles that include sensing coils and the shaft. That is, the output (e.g., volts) of the sensing coils that represents the torque present on the shaft may be affected by the distance between the driving poles and the shaft. As such, as the distance between the driving poles and the shaft changes, the output of the sensing coils may also change. In this way, the portion of the output of the sensing coils that is related to the distance between the driving poles and the shaft and the portion of the output of the sensing coils that is related to the torque present on the shaft may be unclear from the output of the sensing coils, thereby resulting in inaccurate torque measurements.

With this in mind, in one embodiment, in addition to a driving coil that generate magnetic flux (e.g., the magnetic field) that passes through the shaft (e.g., a ferromagnetic material) and is sensed by the sensing coil(s), the magnetostrictive torque sensor may include a proximity coil that may be used to measure a distance between an end of the pole and a piece of conductive metal in front of the proximity coil that corresponds to the item being measured by the torque sensor. Over time, pieces of metal (e.g., part of the shaft) of rotating machinery may vibrate or move with respect to the sensor in question. As a result, the changes in distance may cause the sensing coils of the magnetostrictive torque sensor to output different voltages that may not accurately reflect the amount of torque present on the metal. Accordingly, in one embodiment, the magnetostrictive torque sensor may include hardware components that may receive an output from the proximity coil of the magnetostrictive torque sensor and adjust the output of the sensing coils of the magnetostrictive torque sensor to compensate for the affects that the changing distance may cause to the output of the sensing coils that measure torque. Additional details with regard to adjusting the output of the sensing coils of a torque sensor will be discussed below with reference to FIGS. 1-13.

Figure 1:
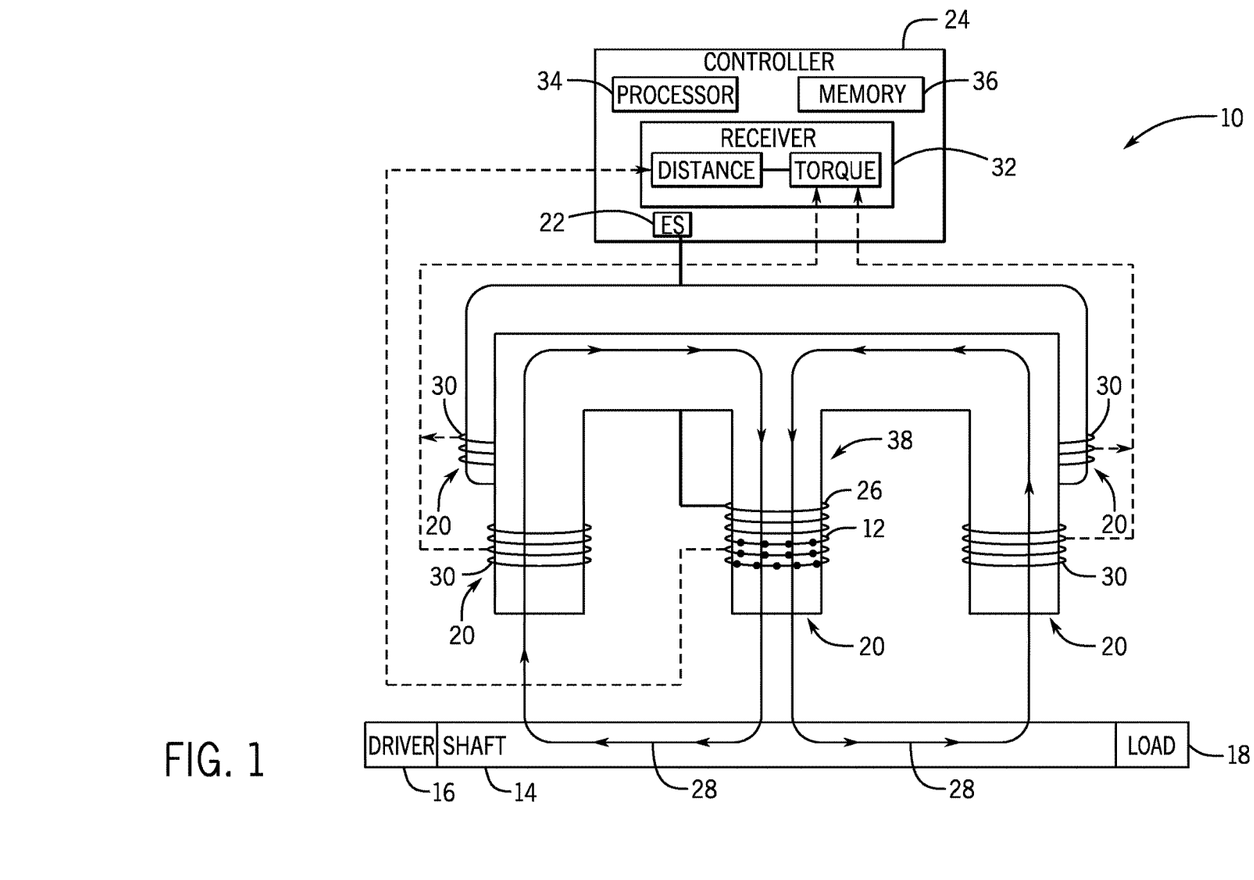
FIG. 1 is a side view of an embodiment of a torque sensing system, in accordance with the present disclosure.

By way of introduction, FIG. 1 is a side view of an embodiment of a torque sensing system 10 that includes a proximity sensor 12 in accordance with embodiments described in the present disclosure. The torque sensing system 10 may be used for sensing a force applied to a shaft 14 (e.g., a rotating shaft, a rotor) or any rotary structure of a machine or equipment, such as a turbomachine (e.g., a turbine engine, a compressor, a pump, or a combination thereof), a generator, a combustion engine, or a combination thereof. The machine or equipment may include a driver 16 (e.g., reciprocating engine, combustion engine, turbine engine, electric motor) that applies a force to the shaft 14 and enables the shaft 14 to rotate and drive a load 18 (e.g., electrical generator, compressor, pump, etc.) of the machine or equipment. The shaft 14 may include ferromagnetic materials including, but not limited to, iron, steel, nickel, cobalt, alloys of one or more of these materials, or any combination thereof. The torque sensing system 10 may include a structure 38 that may include a number of poles 20. In addition, each pole 20 may include various coils wrapped around each respective pole 20. The structure 38 and each pole may be composed of a magnetically permeable material such as a ferrite core or the like.

In one embodiment, the middle pole 20 may include the proximity sensor 12, which may include a conductive wire wrapped around the middle pole 20 a number of times forming a coil. In one embodiment, the proximity sensor 12 may measure a magnetic flux induced in the middle pole 20 by another driver coil 26 that may be disposed on the same pole (e.g., middle pole 20) as the proximity sensor 12. When a conductive metal enters a zone defined by the magnetic field that corresponds to the induced magnetic flux, the magnetic flux changes due to the presence of conductive metal. A controller 24 coupled to the proximity sensor 12 may measure the change in magnetic flux and determine an approximate distance between the conductive metal and an end of the pole 20 that includes the proximity sensor 12. Although the proximity sensor 12 is described as a coil device, it should be noted that the proximity sensor 12 may include any suitable type of device or sensor that outputs a measurement that corresponds to a distance between the middle pole 20 and an object being measured, a distance between an object (e.g., pole) that is attached or physically coupled the proximity sensor 12 and the object being measured, and the like. The proximity sensor 12 may be external to sensor or may be measured within the controller 24. For example, the distance between the middle pole 20 and the object being measured by be measured by an external eddy current probe, via an internal current measurement that correlates with gap, and the like.

In addition to the proximity sensor 12, the middle pole 20 may include a driving coil 26. The driving coil 26 may be coupled to an excitation source 22, which may provide an AC driving current to the driving coil 26. As such, the driving current may pass through the driving coil 26 to induce a magnetic flux portion 28 that emanates from the driving coil 26.

In the illustrated embodiments, the controller 24 is electronically coupled to the excitation source 22 and may control characteristics of the driving current delivered to the driving coil 26 by the excitation source 22. For example, the controller 24 may control the frequency, amplitude, or the like, of the driving current. The controller 24 may be coupled to the excitation source 22 by wired or wireless connections. Wireless communication devices, such as radio frequency (RF) transmitters, may be integrated with the controller 24 to transmit the signals to an RF receiver integrated with the excitation source 22. In certain embodiments, the controller 24 is integrated into the torque sensing system 10.

The outer poles 20 may each include a sensing coil 30 that may detect the magnetic flux portion 28 that is emitted from the driving coil 26 and altered by the presence of the shaft 14. In operation, the driving coil 26 excites a magnetic field (e.g., magnetic flux portion 28) in the shaft 14. That is, the magnetic flux portion 28 permeates the shaft 14, passes through the sensing coil 30, and returns to the driving coil 26, thereby forming a loop through the torque sensor 10 and the shaft 14. The magnetic flux portion 28 is in part sensitive to stress and, as such, the sensing coils 30 may measure the change in the magnetic field due to the presence of stress on the shaft 14. In other words, the sensing coils 30 may measure the magnetic flux portion 28 exiting the shaft 14. A force (e.g., compressive, tensile, torsional, etc.) applied to the shaft 14 may change the magnetic permeability of the shaft 14, thereby causing the magnetic flux portion 28 to change. As such, the torque applied to the shaft 14 may be determined based on the change in magnetic flux portion 28 received by the sensing coil 30 relative to the magnetic flux portion 28 emitted by the driving coil 26. In certain embodiments, the sensing coils 30 may transmit torque signals indicative of the changes (e.g., difference) in the magnetic flux portion 28 to the controller 24. As such, the torque sensing system 10 may measure a torque of the shaft 14.

In addition, because the proximity sensor 12 may be integrated with the torque sensing system 10, the proximity sensor 12 may measure the distance between the end of the middle pole 20 and the shaft 14. That is, the proximity sensor 12 may obtain some measurement that is dependent on the distance between the end of the middle pole 20 and the shaft 14 to measure the distance between the two items. For example, the proximity sensor may use the magnetic flux portion 28 generated by the driving coil 26 to measure an air gap or a distance between the core (e.g., middle pole 20) and the shaft 14. In one embodiment, the controller 24 may receive a voltage that corresponds to the measured distance from the proximity sensor 12 via a receiver component 32. In addition, the controller 24 may receive a second voltage that corresponds to the measured magnetic field detected by each sensing coil 30 via the receiver component 32. The second voltage may thus provide information related to the torque present on the shaft 14.

Although the second voltage may include information related to the torque present on the shaft 14, the second voltage may be affected by the distance between the poles 20 that include the sensing coils 30 and the shaft 14. That is, the sensing coils 30 may be sensitive to changes in the distance of the gap between the end of the poles 20 having the sensing coils 30 and the surface of the shaft 14 in addition to the sensitivity to stress or torque present on the shaft 14. To compensate for the effects to the output of the sensing coils 30 due to the distance of the gap, the controller 24 may use the distance information provided by the proximity sensor 12 to adjust the second voltage output by the sensing coils 30, thereby compensating the second voltage for the effects due to the distance of the gap.

Referring briefly to the controller 24, in some embodiments, the controller 24 may include a distributed control system (DCS) or any computer-based workstation that is fully or partially automated. For example, the controller 24 may be any device employing a general purpose or an application-specific processor 34, both of which may generally include memory circuitry 36 for storing instructions related to frequencies, amplitudes of currents, for example. In addition, the memory circuitry 36 may include instructions and algorithms for integrating sensor signals (e.g., torque and proximity signals) and compensating torque measurements based on the proximity signal (e.g., distance between end of poles 20 and the shaft 14). The processor 46 may include one or more processing devices, and the memory circuitry 48 may include one or more tangible, non-transitory, machine-readable media collectively storing instructions executable by the processor 46 to perform the methods and control actions described herein.

Such machine-readable media can be any available media other than signals that can be accessed by the processor or by any general purpose or special purpose computer or other machine with a processor. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions includes, for example, instructions and data which cause the processor or any general purpose computer, special purpose computer, or special purpose processing machine to perform a certain function or group of functions, such as combining (e.g., integrating) the torque and temperature signals to determine the actual torque measurements.

In one embodiment, the processor 34 of the controller 24 may process the torque signal (e.g., second voltage) received from the sensing coils 30 to calculate the following but is not limited to: force, stress, strain, or torque applied to the shaft 14. That is, the processor 34 may execute pre-stored and/or user-defined algorithms in the memory 36 to calculate the magnitude of the previous values applied to the shaft 14 based on the characteristics of the shaft 14 and the driving current.

The torque signal from the sensing coil 30 may be communicated by wired or wireless connections to the controller 24. In some embodiments, wireless communication devices, such as RF transmitters, may be integrated with the poles 20 (e.g., proximate to the sensing coil 30) to transmit the signals to a radio frequency (RF) receiver integrated with the controller 24. For example, the sensing coils 30 may transmit a torque signal to the receiver 32. The receiver 32 may include electronic components (e.g., an amplifier, filter, or the like) that condition the torque signal (e.g., first voltage) before transmitting the torque signal to the processor 34. In other embodiments, the torque signal may be conditioned after being processed by the processor 34 of the controller 24. Upon receiving the torque signal from the sensing coils 30 and the distance signal from the proximity sensor 12, the processor 34 may compensate the torque signal to filter the effects of the air gap between the sensing coils 30 and the shaft 14.

Figure 2:
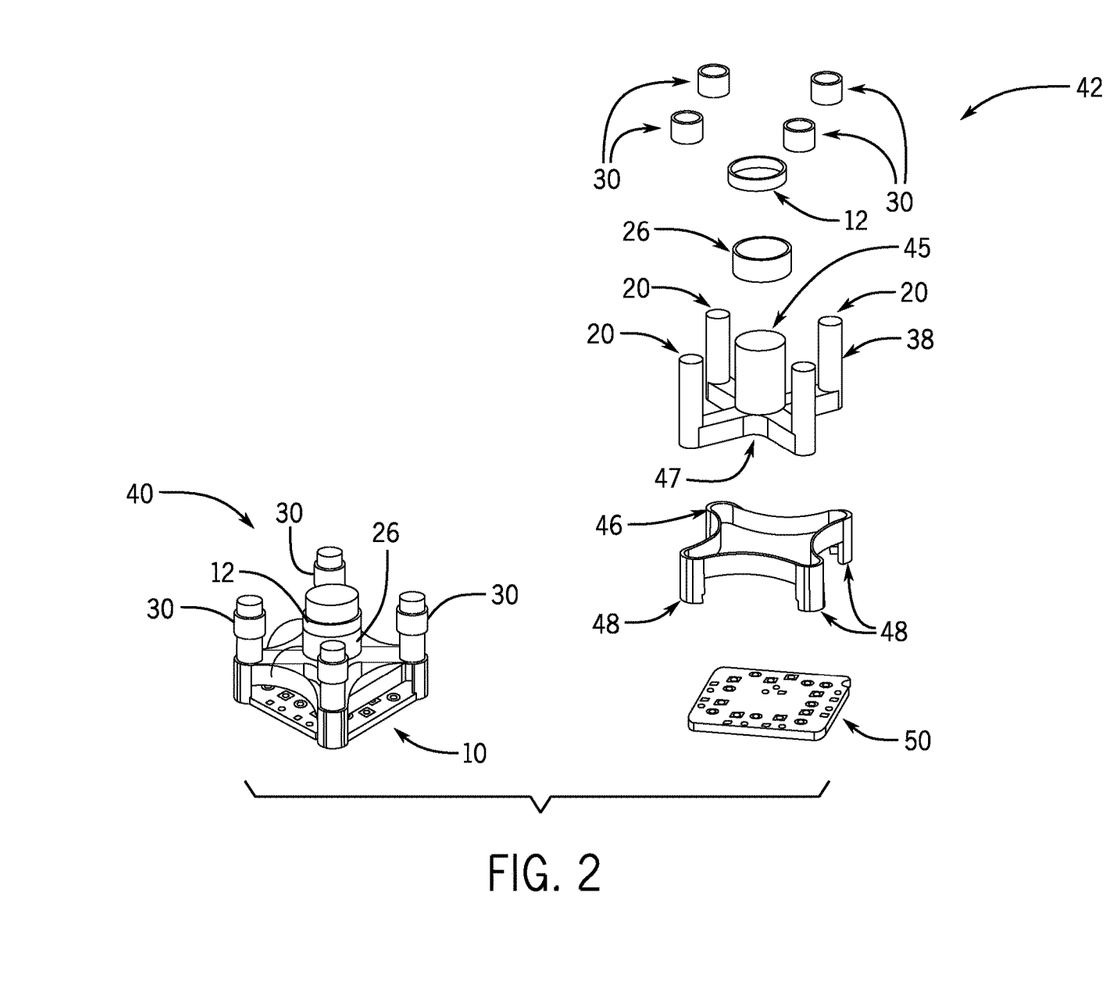
FIG. 2 includes a perspective view and an exploded view of the torque sensing system in FIG. 1, in accordance with the present disclosure

With the foregoing in mind, FIG. 2 illustrates a perspective view 40 and an exploded view 42 of part of the torque sensing system 10. As shown in FIG. 2, the torque sensing system 10 may include sensing coils 30 that may be disposed around the outer poles 20 of a ferrite core 38. The assembly that includes the poles 20 may be composed of a ferrite core 38 that is magnetically permeable when coupled with electrical currents conducting via windings (e.g., driving coil 26).

The middle pole 20 may include the driving coil 26 and the proximity sensor 12. In one example, the proximity sensor 12 may be positioned in front of the driving coil 26, such that the proximity sensor 12 is disposed at an end 45 of the middle pole 20 in the ferrite core 38.

The ferrite core 38 may include five poles 20 as shown in FIG. 2, but it should be noted that the ferrite core 38 may also include any suitable number of poles 20. In some embodiments, the middle pole 20 may have a larger diameter as compared to the outer poles 20, which may each have a substantially similar diameter. However, it should again be noted that the size, shape and orientation of each pole may be constructed in any suitable manner and is not limited to the embodiment described herein.

The ferrite core 38 may fit within an insulator 46. The insulator 46 may have a shape that matches a base 47 of the ferrite core 38. As such, the ferrite core 38 may be placed within the insulator 46. The insulator 46 may also include legs 48 that may be coupled to a printed wiring board (PWB) 50. The legs 48 may position the ferrite core 38 a certain distance away from the ferrite core 38 to prevent circuitry disposed on the PWB 50 from being affected by the magnetic field of the ferrite core 38, and vice versa. The insulator 46 may couple the ferrite core 38 to the PWB 50 and also hold the PWB 50 in place within the torque sensing system 10. In one embodiment, the PWB 50 may include the circuit components that make up the controller 24 described above. In addition the PWB 50 may also include circuit components that enable the torque sensing system 10 to compensate for the distance between the end of the poles 20 and the shaft 14 when calculating the torque present on the shaft 14. Additional details with regard to the circuit components that may be employed to compensate for the effects on the output of the sensing coils 30 caused by the distance will be detailed below with reference to FIG. 4 and FIG. 7.

Figure 3:
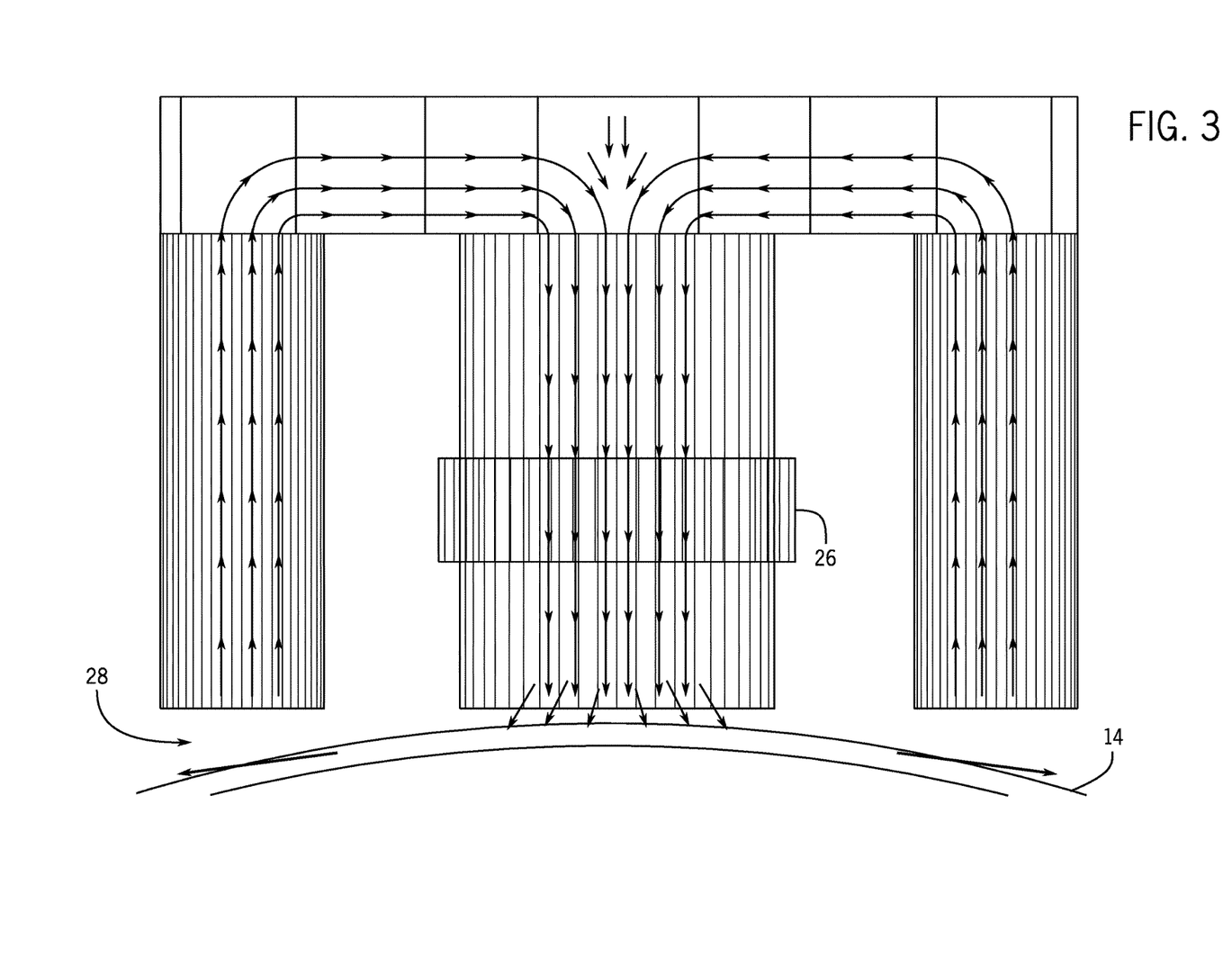
FIG. 3 is an illustration depicting a magnetic field emitted by the torque sensing system of FIG. 1, in accordance with the present disclosure.

With the foregoing in mind, FIG. 3 illustrates how the magnetic flux portion 28 may travel from the driving coil 26 to the shaft 14 and back to the sensing coils 30. As shown in FIG. 3, the magnetic flux portion 28 permeates the shaft 14, passes through the sensing coil 30, and returns to the driving coil 26. The voltages detected by the sensing coils 30 may be used to determine the stress or torque present on the shaft 14. In addition, the voltage output by the proximity sensor 12 may also be used to reduce the effects of the distance between the poles 20 housing the sensing coils 30 and the shaft 14 that may be present on the voltages output by the sensing coils 30.

Figure 4:
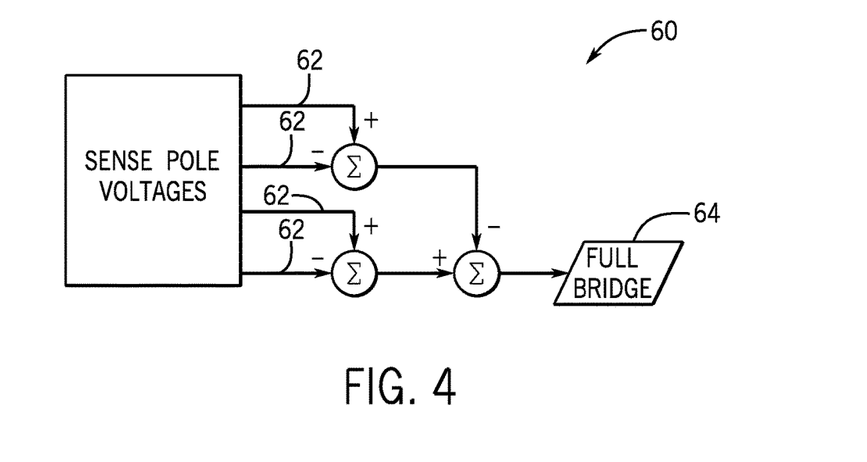
FIG. 4 is block diagram of a circuit employed to determine a full bridge voltage of the torque sensing system of FIG. 1, in accordance with the present disclosure.

With this in mind, FIG. 4 illustrates a block diagram of a circuit 60 for combining voltages 62 output by the sensing coils 30 to output a full bridge voltage output 64 that is representative of the amount of torsional stress being applied to the shaft 14. That is, the multiple sense coils 30 and poles 20 may be used to isolate certain stress patterns that may be present in the object being measured and the sense coils 30 may also amplify signals that represent the stress patterns. The signals (e.g., voltages) of each sense coil 30 may then be combined in either the controller 24 or torque receiver 32 to determine the amount of torsional stress being applied to the object being measured (e.g., shaft 14). As shown in FIG. 4, the difference between two pair of sensor coils 30 may first be determined and the difference between those two values may be determined, thereby generating the full bridge voltage output 64.

Figure 5:
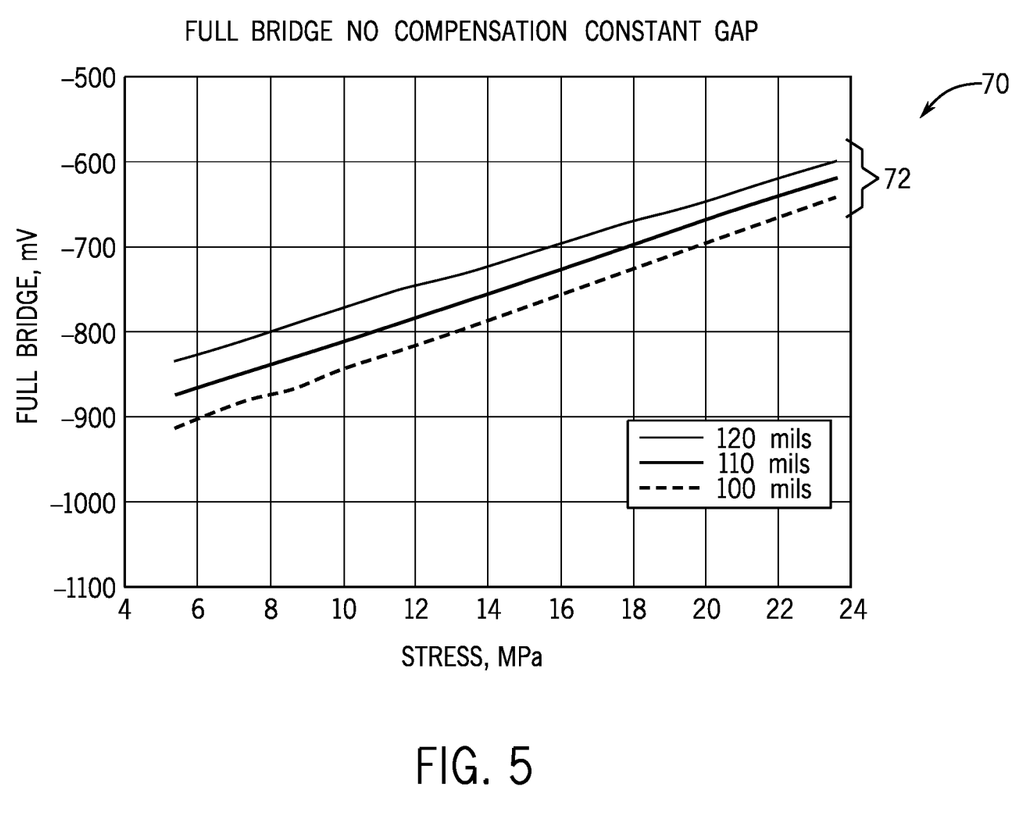
FIG. 5 is a graph depicting an output of a full bridge voltage output of the torque sensing system of FIG. 1 with respect to the amount of stress being applied on the object being measured, in accordance with the present disclosure.

To better understand how the full bridge voltage output 64 is influenced by the gap (e.g., distance between pole and shaft) and stress, FIG. 5 illustrates a graph 70 that depicts a number of full bridge voltage outputs 64 at constant gap with respect to various stress levels of the object being measured. As shown in the graph, the full bridge voltage output lines 72 are widely separated. As such, if the full bridge voltage output 64 reads −800 mV, it could be because the gap is 120 mils and the stress is at 9 MPa, the gap is 110 mils and the stress is 11 MPA, the gap is 100 mils and the stress is 13 MPa, etc. As shown in the graph 70, as the distance between the poles 20 and the object being measured changes, the full bridge voltage output 64 changes. In this way, it is clear that the full bridge voltage output 64 of the sensing coils 30 is influenced by the distance between the poles 20 and the object.

Figure 6:
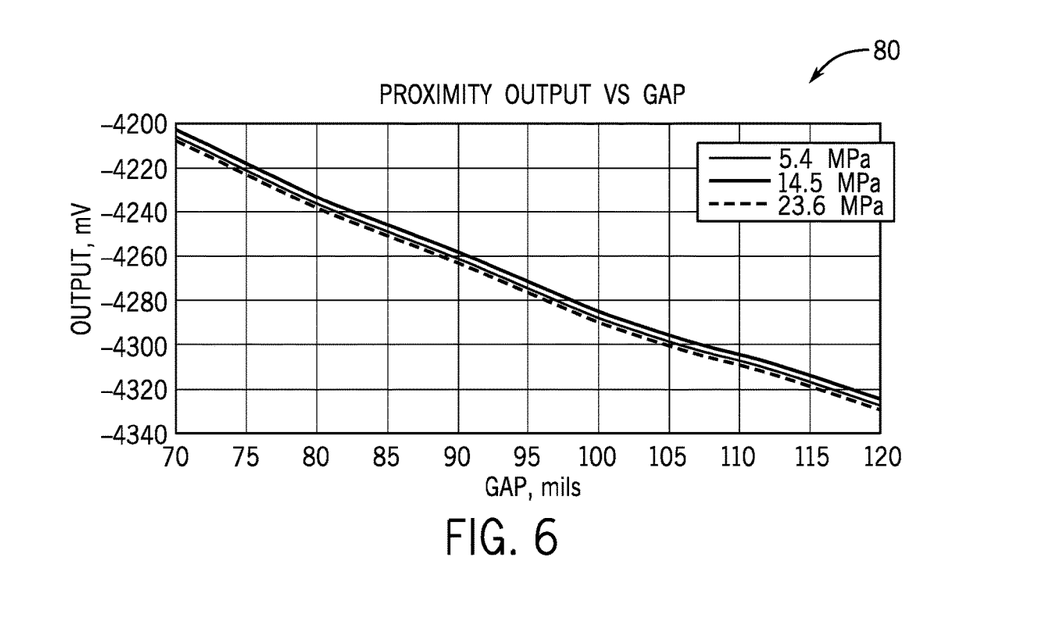
FIG. 6 is a graph depicting an output of a proximity coil within the torque sensing system of FIG. 1 with respect to the amount of air gap between the proximity coil and the object being measured, in accordance with the present disclosure.

Keeping the foregoing in mind, FIG. 6 illustrates a sample graph 80 depicting typical curves associated with a number of proximity sensor 12 signals indicative of a distance of the gap as measured with respect to varying levels of stress of the object being measured. In other words, the various lines depicted in the graph 80 indicate how the proximity sensor signals changes with respect to the distance between the middle pole 20 having the proximity sensor 12 and the object being measured when different levels of stress of torsion (e.g., MPa) are being applied to the object. As shown in the graph 80, the proximity sensor signals are less sensitive to stress as the distance between the middle pole 20 and the object being measured increases. That is, each depicted line in the graph 80 closely matches each other regardless of the amount of stress applied on the object.

The objective of the gap compensation scheme described herein includes removing the influences of the gap from the full bridge voltage output 64 using signals indicative of the distance of the gap from the proximity sensor 12. If the influence of the gap is removed from the full bridge voltage output 64, the graph in FIG. 5 would collapse to a single line such that a given full bridge output voltage 64 would correlate with a stress level and be truly independent of gap. In certain embodiments, the compensation of the full bridge output voltage 64 based on signals received from the proximity sensor 12 may be done in a two stage process: offset and gain, which are discussed in further detail below.

Figure 7:
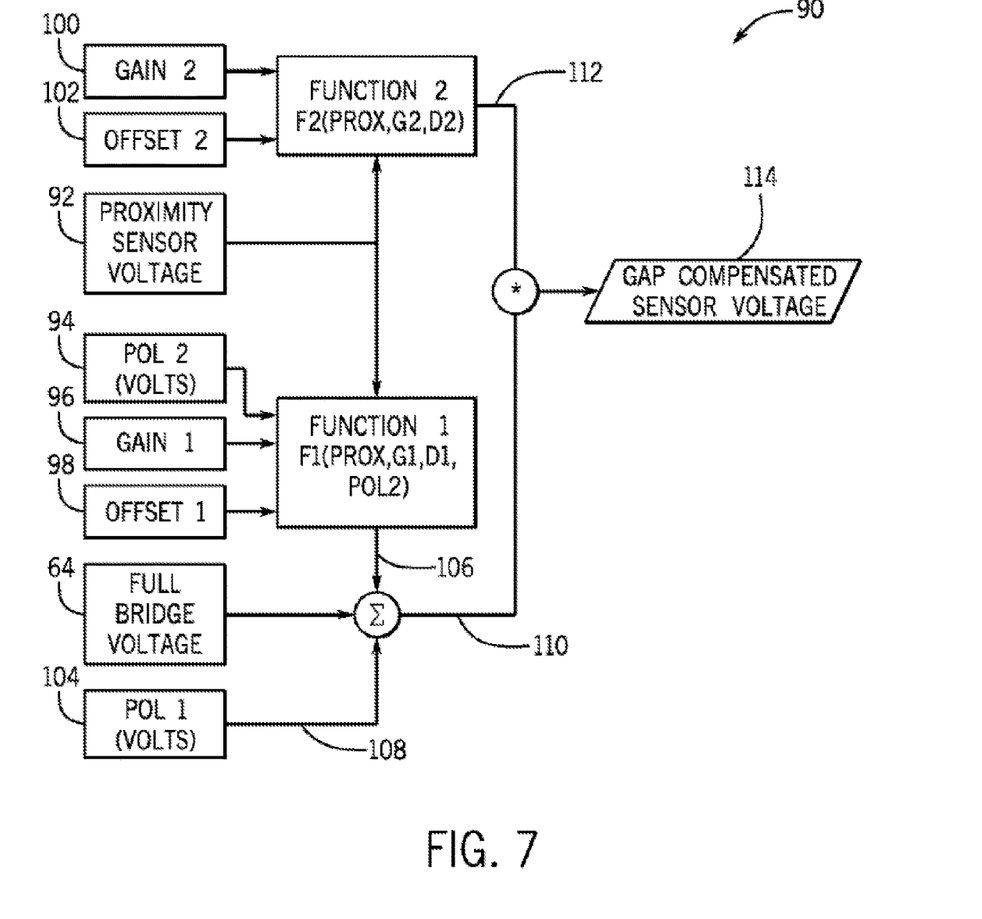
FIG. 7 is block diagram of a circuit employed to compensate for gap-induced sensitivity effects on the torque sensing system of FIG. 1, in accordance with the present disclosure.

To reduce the effects of the change in distance between the poles 20 and the shaft 14 that may be applied to the outputs (e.g., full bridge voltage output 64) of the sensing coils 30, the torque sensing system 10 may use measurements that correspond the distance between the poles 20 and the shaft 14 to compensate for the influence of the distance present on the outputs of the sensor coils 30. With this in mind, FIG. 7 illustrates a block diagram of a circuit 90 that may be employed to compensate for gap-induced sensitivity effects on the torque sensing system 10. Generally, the circuit 90 is designed to remove a portion (e.g., voltage) of the outputs by the sensing coils 30 that are caused by the distance between the poles 20 and the shaft 14, as measured by the proximity sensor 12.

To accurately reduce the effects due to distance present in the full bridge output 64, the circuit 90 may perform some signal processing techniques to ensure that the appropriate electrical signals of the outputs in the sensing coils 30 are reduced or removed. As described herein, the circuit 90 may be implemented using analog circuit components or may be implemented with digital logic components such as the processor 34 or the like.

Referring now to FIG. 7, the circuit 90 includes eight inputs including the full bridge voltage output 64 and a proximity sensor signal 92 received via the sensor coils 30 and the proximity sensor 12, respectively. The remaining inputs may be used to tune or increase the performance of the sensor. For instance, the tuning inputs may include a potentiometer 94, a gain 96, an offset 98, a gain 100, an offset 102, and a potentiometer 104.

With this in mind, in one embodiment, the proximity sensor output 92 may be provided as inputs to two transfer functions (e.g., Function 1 and Function 2), each of which may be dependent on the tunable inputs mentioned above. By way of example, the transfer functions may be a linear transfer function or an exponential transfer function.

As shown in FIG. 7, an output 106 of the first function (F1) may be a voltage that may be used to offset the full bridge voltage output 64. In addition, an additional offset 108 output by the potentiometer 104 may be summed together with the full bridge voltage output 64 to create an offset compensated full bridge voltage output 110. As a result, the gap sensitivity at the 0 or low stress point may be reduced and this low stress point may be moved to a 0 volt output. In one embodiment, the offset compensate full bridge signal 76 is represented as:

Offset Compensated Full Bridge Voltage Output 110=full bridge voltage output 64+additional offset 108+output 106

Figure 8:
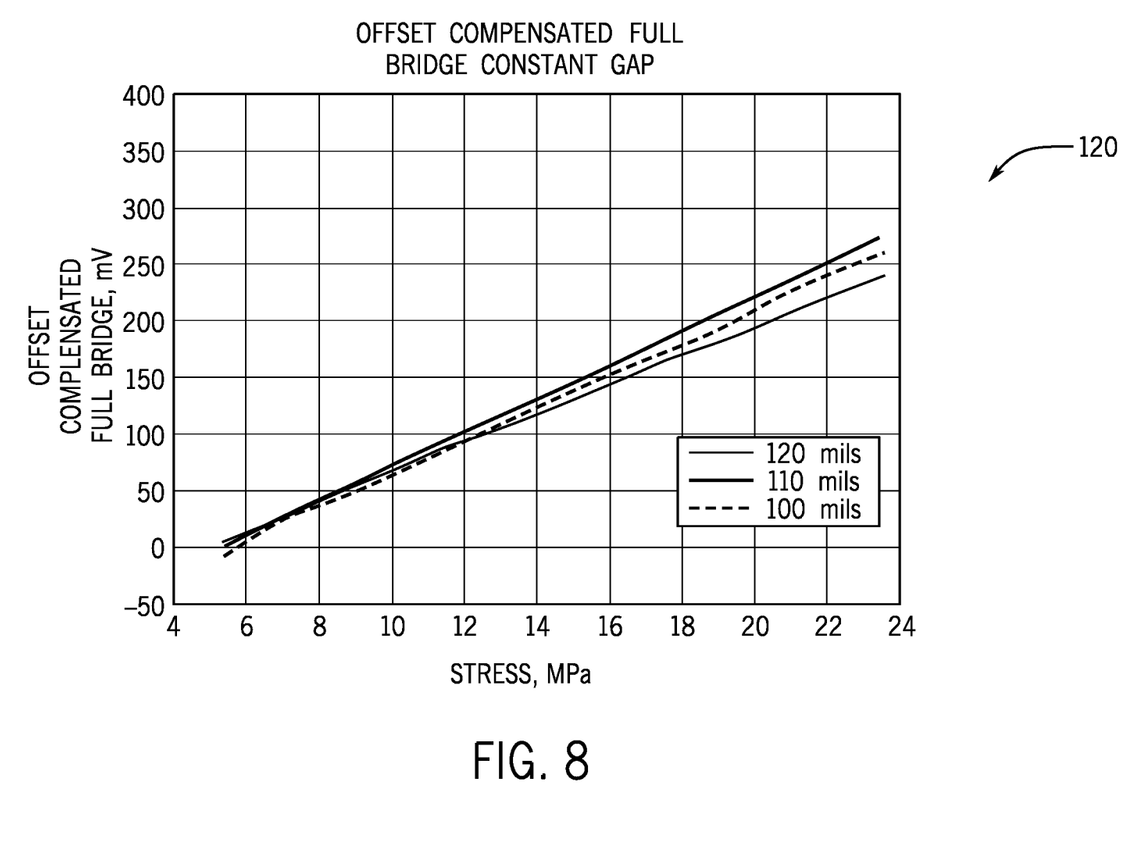
FIG. 8 is a graph depicting the offset compensated full bridge voltage output of the torque sensing system of FIG. 1 with respect to the amount of stress being applied to the object being measured, in accordance with the present disclosure.

FIG. 8 illustrates a graph 120 of the offset compensated full bridge voltage output 110. Contrasting the graph 120 of FIG. 8 with the graph 70 of FIG. 5, it is apparent that the offset compensation stage collapsed the low stress point to near zero volts. As such, at relatively low stress levels, the output of the sensor coils 30 is relatively independent of gap. However, the problem may still persist as stress increases.

Referring back to the circuit 90 of FIG. 7, the second stage for compensating the full bridge voltage output 64 includes using an output 112 of the second function (F2). As shown in FIG. 7, the second function (F2) may apply the gain 100 and the offset 102 to the proximity sensor voltage 92 to create the signal 112 that is multiplied against offset compensated full bridge voltage output 110. At this stage of the circuit 90, the dependence on gap with respect to the relatively high stress side depicted in the graph 120 of FIG. 8 may be reduced. That is, the signal 112 may be multiplied by the offset compensated full bridge voltage output 110 to produce a fully compensated signal 114.

Figure 9:
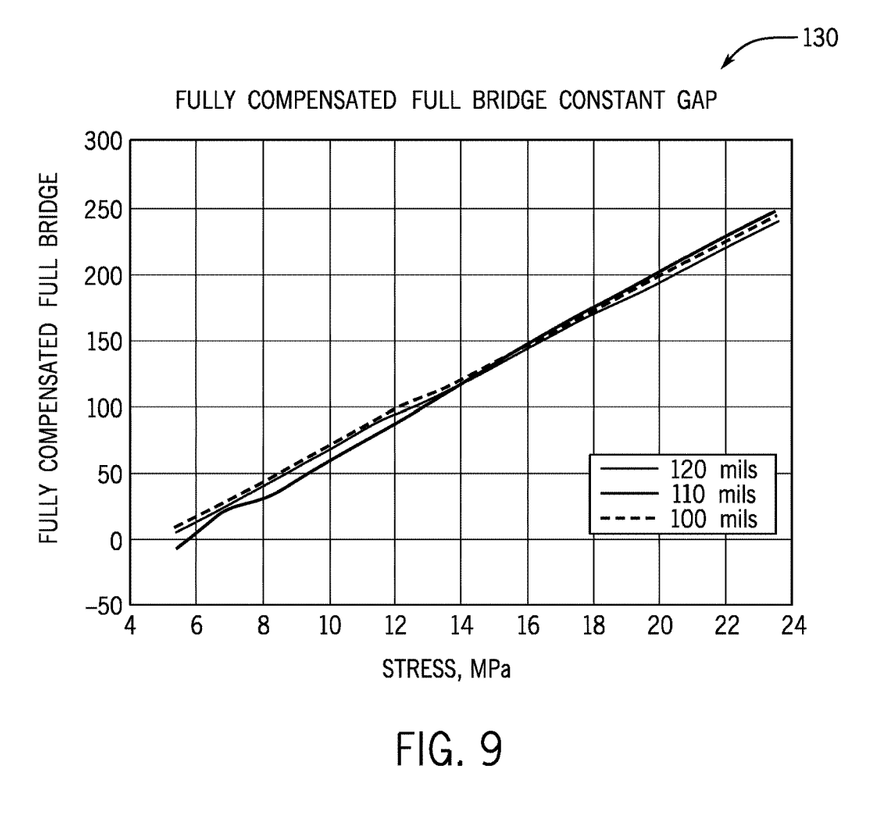
FIG. 9 is a graph depicting an output of the torque sensing system of FIG. 1 with respect to an amount of stress after the output is fully gap compensated, in accordance with the present disclosure.

The fully compensated signal 114 may thus cause the lines depicted in the graph 120 of FIG. 8 to collapse close to one line, as illustrated in graph 130 of FIG. 9. In other words, FIG. 9 shows the fully compensated signal 114 after both stages of the circuit 90 are complete. As seen in the graph 130, the relationship between the full bridge voltage output and the amount of stress being applied to the object being measured is not influenced greatly by the gap (e.g., 120 mils, 110 mils, etc.). Instead, each of the lines of the graph 130 has almost entirely collapsed to a single line and that a single voltage of the sensing coils 30 now is correlated with stress in the object.

Figure 10:
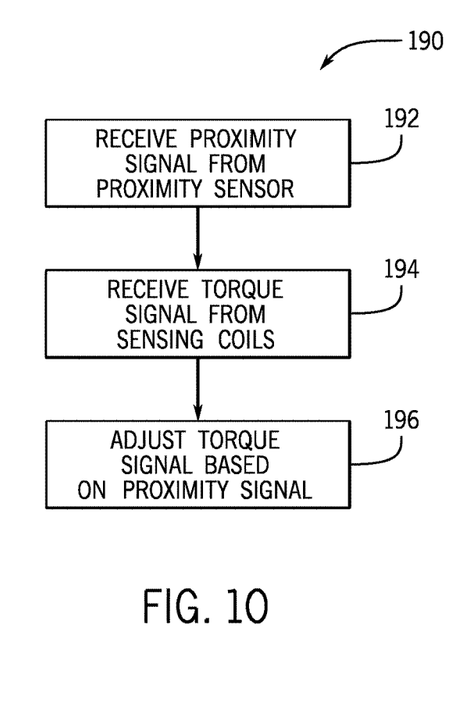
FIG. 10 is a flow chart of a method for compensating a torque signal based on a proximity signal received via a proximity sensor within the torque sensing system of FIG. 1, in accordance with the present disclosure.

With the foregoing in mind, FIG. 10 illustrates a flow chart of a method 190 that generally described the process employed by the circuit 90 to compensate the signals received via the sensing coils 30 based on the signal received via the proximity sensor 12. In addition to using the circuit 90 to perform the method 190, it should be noted that the method 190 may also be performed by the processor 34 using various software components. For the purposes of discussion, the following description of the method 190 will be detailed as being performed by the processor 34.

Although the method 190 will be described in a particular order, it should be understood that the method 190 may be performed in any suitable order.

Referring now to FIG. 10, at block 192, the processor 34 may receive a proximity signal (e.g. first voltage) via the proximity sensor 12. The proximity signal may represent a distance between an end of a portion of a magnetically permeable material attached to the proximity sensor 12 and the object (e.g., shaft 14) adjacent to the end of the portion of a magnetically permeable material. That is, the proximity sensor 12 may measure an air gap between the middle pole 20 and the shaft 14 regardless of where the proximity sensor 12 is positioned on the middle pole 20. However, for different types of proximity sensors 12, the measurement may be a distance between the pole 20 having the proximity sensor 12 and the shaft 14, for example.

At block 194, the processor 34 may receive a torque signal (e.g., second voltage) from the sensing coils 30. As discussed above, the torque signal may represent an amount of force (e.g., torque) that may be present on the object adjacent to the sensing coils 30. In addition, the torque signal may include influences due to the distance between the poles 20 associated with the sensing coils 30 and the object.

To compensate the toque signal, the processor 34, at block 196, may adjust the torque signal based on the proximity signal received via the proximity sensor 12. That is, the processor 34 may use the feedback signal provided by the proximity sensor 12 that indicates the distance between the middle pole 20 and the object to compensate for the effects that the distance may cause on the torque signal. In other words, the processor 24 may use the proximity signal to adjust the torque signal to filter the effects of distance between the poles 20 of the sensing coils 30 and the object may cause to the torque signal.

In certain embodiments, the processor 34 may adjust the torque signal by applying a linear offset to the torque signal, as discussed above. In addition, the processor 34 may apply a multiplicative correction factor to the torque signal as described above. As a result, the adjusted torque signal may more accurately represent the force present on the object being measured by the sensing coils 30.

Technical effects of the subject matter disclosed herein include, but are not limited to, integrating a non-contact proximity sensor with a torque sensor, such that the distance of an air gap between the poles and an object being measured does not affect the output of the torque sensor. Advantageously, a torque sensing system may more accurately represent the torque measurements present on the object being measured.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a first sensor comprising:
        a driving pole comprising a driving coil configured to receive a driving current and to emit a magnetic flux portion through a structure;

a sensing pole comprising a sensing coil configured to receive the magnetic flux portion that exits the structure and to generate a first signal based at least in part on a change in the received magnetic flux portion relative to the emitted magnetic flux portion, wherein the first signal is indicative of a force on the structure;

a second sensor including a proximity coil disposed on the driving pole at a position closer to an end of the driving pole than the driving coil, wherein the second sensor is configured to measure a magnetic flux induced in the driving pole by the emitted magnetic flux portion, and to generate a second signal representative of a distance between the driving pole and the structure; and a circuit configured to adjust the first signal based on the second signal.

2. The system of claim 1, wherein the proximity coil is positioned at an end of the driving pole.

3. The system of claim 1 wherein the circuit is configured to compensate for one or more effects of the distance applied to the first signal based on the second signal.

4. The system of claim 1, wherein the circuit is configured to apply a linear offset to the second signal, thereby generating a third signal.

5. The system of claim 4, wherein the circuit is configured to combine the first signal and the third signal to compensate for effects of distance between the driving pole and the structure.

6. The system of claim 1, wherein the first sensor comprises a magnetostrictive sensor.

7. A method, comprising:

emitting, by a driving coil mounted to a magnetically permeable driving pole, a magnetic flux portion through an object in response to receipt of a driving current;

generating, by a proximity sensor, a first signal indicative of a distance between the magnetically permeable driving pole and the object, wherein the proximity sensor includes a proximity coil, different from the driving coil, mounted to the magnetically permeable pole, and wherein the first signal is based at least in part a magnetic flux induced in the driving pole by the emitted magnetic flux portion;

generating, by a sensing coil, a second signal indicative of a force present on the object, wherein the sensing coil is mounted to a sensing pole, and wherein the second signal is based at least in part on a change in a magnetic flux portion received at the sensing coil relative to the emitted magnetic flux portion; and adjusting, via a processor, the second signal based on the first signal.

8. The method of claim 7, wherein adjusting the second signal comprises compensating for one or more effects of the distance applied to the first signal.

9. The method of claim 7, comprising applying a linear offset to the first signal prior to adjusting the second signal.

10. The method of claim 7, comprising applying a correction factor to the adjusted second signal.

11. The method of claim 7, comprising:

generating, by a plurality of sensing coils mounted to respective sensing poles, a plurality of signals indicative of the force present on the object, combining, via a circuit, the plurality of signals generated by the plurality of sensing coils, to generate the first signal.

12. A sensor, comprising:

a driving coil configured to emit a magnetic flux portion through a structure;

at least one sensing coil configured to receive the magnetic flux portion that exits the structure and to generate a first signal based at least in part on the received magnetic flux portion, wherein the first signal is based at least in part on a force on the structure;

a proximity sensor including a proximity coil configured to generate a second signal representative of a distance between a magnetically permeable pole, configured to couple to the proximity sensor, and the structure; and a circuit configured to compensate for effects due to the distance present on the first signal based on the second signal;

wherein the driving coil and the proximity coil are different from one another and each is disposed on the magnetically permeable pole.

13. The sensor of claim 12, wherein the magnetically permeable pole comprises a ferrite core.

14. The sensor of claim 12, wherein the proximity coil is positioned at an end of the magnetically permeable pole.

15. The sensor of claim 12, wherein the at least one sensing coil comprises four sensing coils, each configured to generate a respective first signal.

16. The sensor of claim 15, wherein the circuit is configured to combine the four first signals generated by the four sensing coils to generate a combined first signal.

17. The sensor of claim 12, wherein the circuit is configured to apply a linear offset to the second signal.

18. The sensor of claim 12, wherein the circuit is configured to compensate for effects due to the distance present on the first signal based on the second signal by applying a correction factor to the first signal.

* * * * *